(12) United States Patent
Bell (10) Patent No.: US 7,357,040 B2
(45) Date of Patent: Apr. 15, 2008

(54) TORUS WEDGE FLOW METER

(76) Inventor: Joel David Bell, 1167 Barkston Dr., Katy, TX (US) 77450

( * ) Notice: Subject to any disclaimer, the term of this patent is extended or adjusted under 35 U.S.C. 154(b) by 0 days.

(21) Appl. No.: 11/202,695

(22) Filed: Aug. 13, 2005

(65) Prior Publication Data

US 2007/0034018 A1 Feb. 15, 2007

(51) Int. Cl.
*G01F 1/44* (2006.01)
*G01F 1/37* (2006.01)

(52) U.S. Cl. .................... 73/861.63; 73/861.52

(58) Field of Classification Search ............. 73/861.52, 73/861.63
See application file for complete search history.

(56) References Cited

U.S. PATENT DOCUMENTS

| | | | |
|---|---|---|---|
| 3,025,878 A | 3/1962 | Hupp | |
| 3,654,960 A | 4/1972 | Kiernan | |
| 4,237,739 A | 12/1980 | Owen et al. | |
| 4,926,698 A | 5/1990 | Owen | |
| 5,036,884 A | 8/1991 | Miller et al. | |
| 5,458,006 A | 10/1995 | Roqueta | |
| 5,463,908 A | 11/1995 | Rosolia | |
| 5,803,123 A | 9/1998 | Bell et al. | |
| 5,848,607 A | 12/1998 | Bell et al. | |
| 6,672,173 B2 | 1/2004 | Bell | |

*Primary Examiner*—Harshad Patel
(74) *Attorney, Agent, or Firm*—Charles S. Knobloch; Arnold & Knobloch, L.L.P.

(57) ABSTRACT

A flow meter for measuring the volume of fluid flowing through the meter includes an inner cylindrical tube through which the fluid flows and an outer cylindrical tube tending over the inner cylindrical tube. The outer cylindrical tube is radially spaced from the cylindrical inner tube to provide an annular cylindrical space between the inner cylindrical tube and the outer cylindrical tube. A seal between the inner cylindrical tube and the outer cylindrical tube closes the annular cylindrical space adjacent ends of the annular cylindrical space. The inner cylindrical tube further defines at least one opening in a wall of the inner cylindrical tube to balance the fluid pressure in the annular cylindrical space with the pressure in the inner cylindrical tube. A torus wedge flow restriction member is integrally formed within full internal circumference the inner cylindrical tube for restricting the flow of fluid through the inner cylindrical tube and produces a pressure drop in the fluid as it flows past the flow restriction member. The inner cylindrical tube and the outer cylindrical tube in combination further define at least one port for receiving a pressure sensing device to measure the pressure of the fluid flowing through the flow meter.

27 Claims, 6 Drawing Sheets

FIG. 1
(Prior Art)

FIGURE 3
HOLLOWCORE BOLT DETAIL
TYPICAL OF 2

TORUS WEDGE FLOW METER

BACKGROUND

The present invention relates to flow meters in general, and in particular to flow meters that employ a wedge-shaped flow restricting element producing a pressure drop within the flow meter to indicate the volume of fluid flowing through the flow meter.

The use of wedges to create a pressure drop in flow meters for measurement of the volume of fluid passing through a flow meter is known in the art. Wedge-shaped flow meters are described in U.S. Pat. No. 4,237,739 issued on Dec. 9, 1980, U.S. Pat. No. 4,926,698 issued on May 22, 1990, and U.S. Pat. No. 6,672,173. The '739 patent describes a flow meter using a single wedge affixed to the internal wall of the flow meter whereas the '698 patent describes a flow meter having two opposing wedges mounted on opposite sides of the flow meter interior wall. Either arrangement creates an opening within the flow meter having a reduced cross-sectional area in the flow-path of the fluid thereby creating a pressure differential on opposite sides of the wedge or wedges. The pressure differential created on opposite sides of the wedges has a known mathematical relationship to the flow rate of the fluid passing there through, and as long as the cross-sectional area of the opening at the wedge is constant, the fluid flow measurements are very accurate. The '173 patent discloses A flow meter for measuring the volume of fluid flowing through the meter includes an inner cylindrical tube through which the fluid flows and an outer cylindrical tube tending over the inner cylindrical tube. With this meter a flow restriction member is mounted to an inner surface of the inner cylindrical tube for restricting the flow of fluid through the inner cylindrical tube and process a pressure drop in the fluid as it flow past the flow restriction member.

Figure 1:
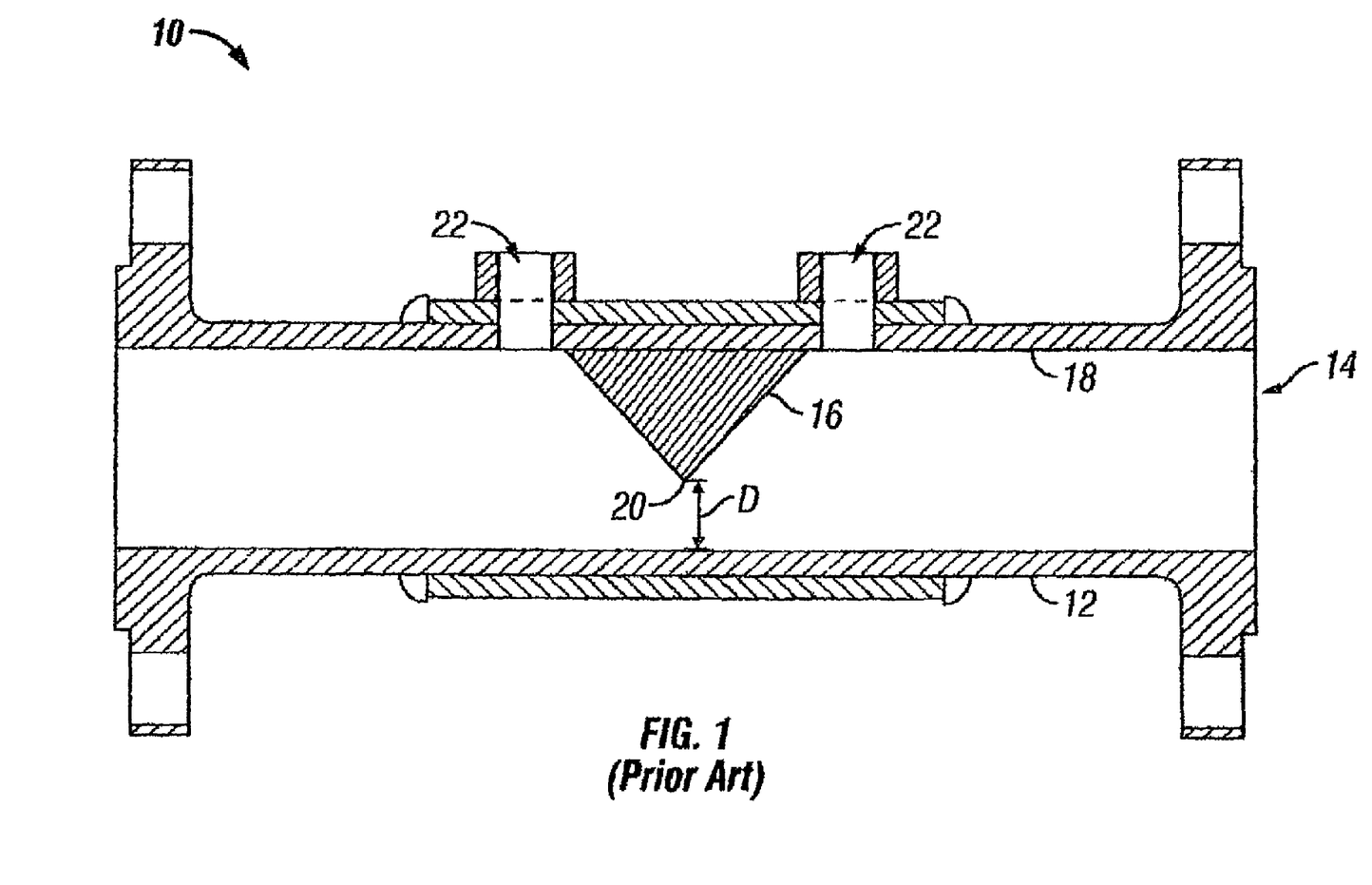
FIG. 1 is a prior art flow meter incorporating an internal wedge to restrict the fluid flow.

FIG. 1 shows a typical prior art flow meter 10 shown in cross-section. Flow meter 10 generally comprises a tubular housing 12 having a longitudinal passageway 14 in which a wedge-shaped member 16 is affixed to the inner wall 18 of housing 12 thereby creating at apex 20 of wedge 16 a restricted cross-sectional area represented by dimension D. At least two ports 22 are defined by housing 12. One of ports 22 is positioned upstream from wedge 16 and the other ports 22 is positioned downstream from wedge 16. Ports 22 are in fluid communication with the interior flow through passage 14 thereby permitting the detection of the pressure differential induced by wedge 16 restricting fluid flow through flow meter 10.

Nevertheless, fluid flow conditions under which the flow meters are used are variable and tend to change. Specifically, temperature changes and changes in the pressure of the fluid being measured cause the diameter of the passageway through the flow meter to expand and contract. Consequently, the cross-sectional area between the wedge apex and the flow meter wall opposite the wedge does not remain constant. Small changes in the flow meter passageway diameter or the distance between the wedge apex and the wall opposite from the wedge can make substantial changes in the pressure drop of the fluid flowing past the wedge. Consequently, these changes introduce unwanted errors in the calculated volume of fluid flowing through the meter.

Thus, there is a need within the industry for a torus 360 degree wedge-type flow meter where changes in the pressure and temperature of the fluid being measured by the flow meter will minimally affect the formed internal wedge element. The torus wedge is a significant departure from the traditional orifice plate technology and an enhancement of current wedge technology. The torus wedge flow meter will offer a fluid profile which does not generate fluid phase separation within the flow stream.

SUMMARY OF THE INVENTION

One aspect of the present invention is a flow meter for measuring the volume of fluid flowing through the meter which includes an inner cylindrical tube through which the fluid flows and an outer cylindrical tube tending over the inner cylindrical tube. The outer cylindrical tube is radially spaced from the cylindrical inner tube to provide an annular cylindrical space between the inner cylindrical tube and the outer cylindrical tube. A seal between said inner cylindrical tube and the outer cylindrical tube closes the annular cylindrical space adjacent the ends of the annular cylindrical space. The inner cylindrical tube allows fluid pressure to enter the radial space between the inner cylindrical tube and the outer cylindrical tube through a surface opening opposite the sealed end of the inner cylindrical tube to provide pressure balancing between the pressure in the annular cylindrical space and the pressure in the inner cylindrical tube. A flow restriction member is formed within the internal circumference of the inner cylindrical tube. The flow restricted member is a torus wedge having a full internal 360 degree circumference V-shaped restriction, which reduces the area available to flow. Each side of the torus wedge has an inclined fluid flow surface to channel the incoming and outgoing fluid flow through the center annulus of the torus wedge. As fluid velocity increases due to contraction of fluid volume at the entrance to the restriction, the kinetic energy of the fluid increases. Thus, a corresponding decrease in static pressure or potential energy of the fluid occurs to preserve conservation of the total energy. The inner cylindrical tube and the outer cylindrical tube in combination further define at least two ports for receiving a pressure sensing device to measure the pressure of the fluid flowing through said flow meter. In an alternative embodiment of the present invention, a torus 360 degree wedge member can be incorporated into the outer cylindrical tube. In this alternative embodiment there is no inner cylindrical tube.

Another aspect of the present invention is a fluid flow meter for measuring the volume of fluid flowing through a passageway. The meter includes an outer housing having a first internal bore, and a removable inner member telescopically received in the first internal bore. The first internal bore and an outer surface of the inner member in combination define a cannular space therebetween wherein the cannular space is isolated from fluid flowing there through. The inner member has a second internal bore of a first predefined cross-sectional area to accommodate the fluid flow there through and is in pressure equalizing communication with the cannular space. A torus wedge metering structure is formed within the full 360 degree internal circumference of the inner member for measuring the fluid flow there through.

Yet, another aspect of the invention is a method for measuring the flow of a fluid through a tube. The method comprises the steps of providing an outer housing having an internal bore, and providing a calibrated tubular flow metering device having a torus wedge flow restrictor integrally formed therein. The flow metering device is inserted within the outer housing internal bore in a telescoping fashion to create a cannular space between the outer housing and the metering device. The pressure of the cannular space is equalized with the internal pressure of the flow metering device. The combined outer housing and calibrated tubular flow metering device are coupled in the flow path of a fluid, and the pressure differential on each side of the flow restrictor is then measured.

These and other advantages of the invention will be further understood and appreciated by those skilled in the art by reference to the following written specification, claims and appended drawings.

BRIEF DESCRIPTION OF THE DRAWINGS

FIG. 4A is a cross-sectional view of the calibrated tube taken along the horizontal center line, showing pressure equalization hole 90.

DESCRIPTION OF THE PREFERRED EMBODIMENT

Figure 2:
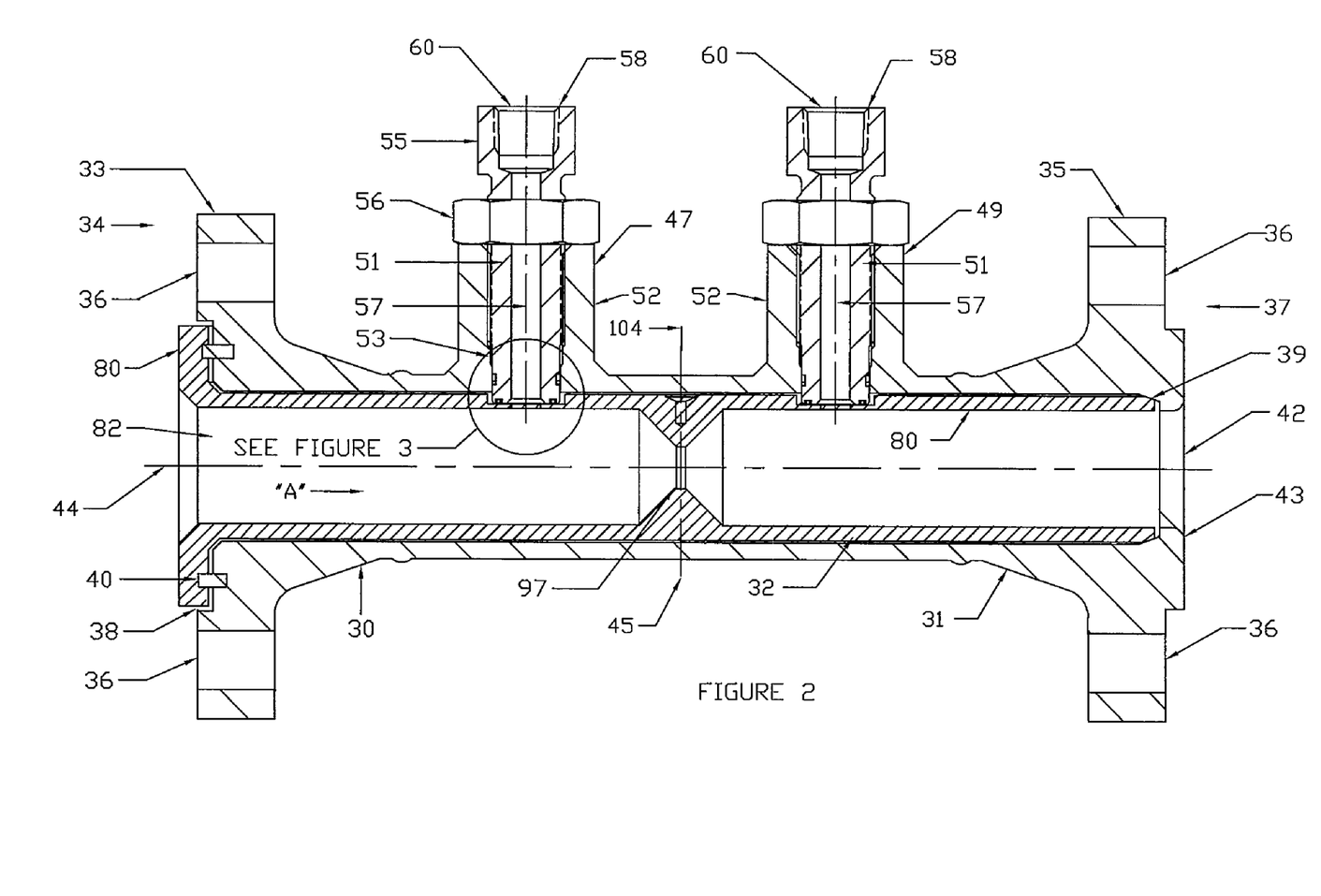
FIG. 2 is a cross-sectional view, shown along a horizontal center line of a fluid flow meter embodying the present invention.

For purposes of description herein, the terms "upper", "lower", "right", "left", "rear", "front", "vertical", "horizontal" and derivatives thereof shall relate to the invention as oriented in FIG. 2. However, it is to be understood that the invention may assume various alternative orientations and step sequences, unless it is expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
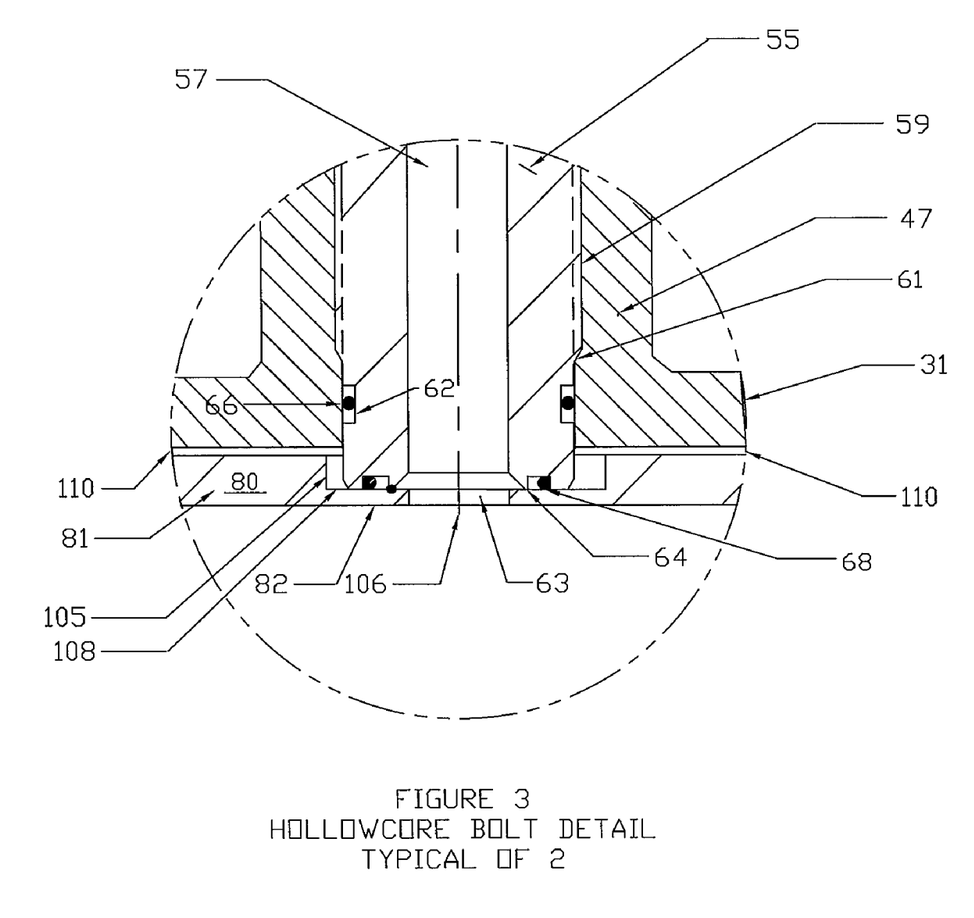
FIG. 3 is a cross-sectional view of the circular area III of FIG. 2 taken at the location where the hollow core bolt interfaces with the calibrated tube.
Figure 4:
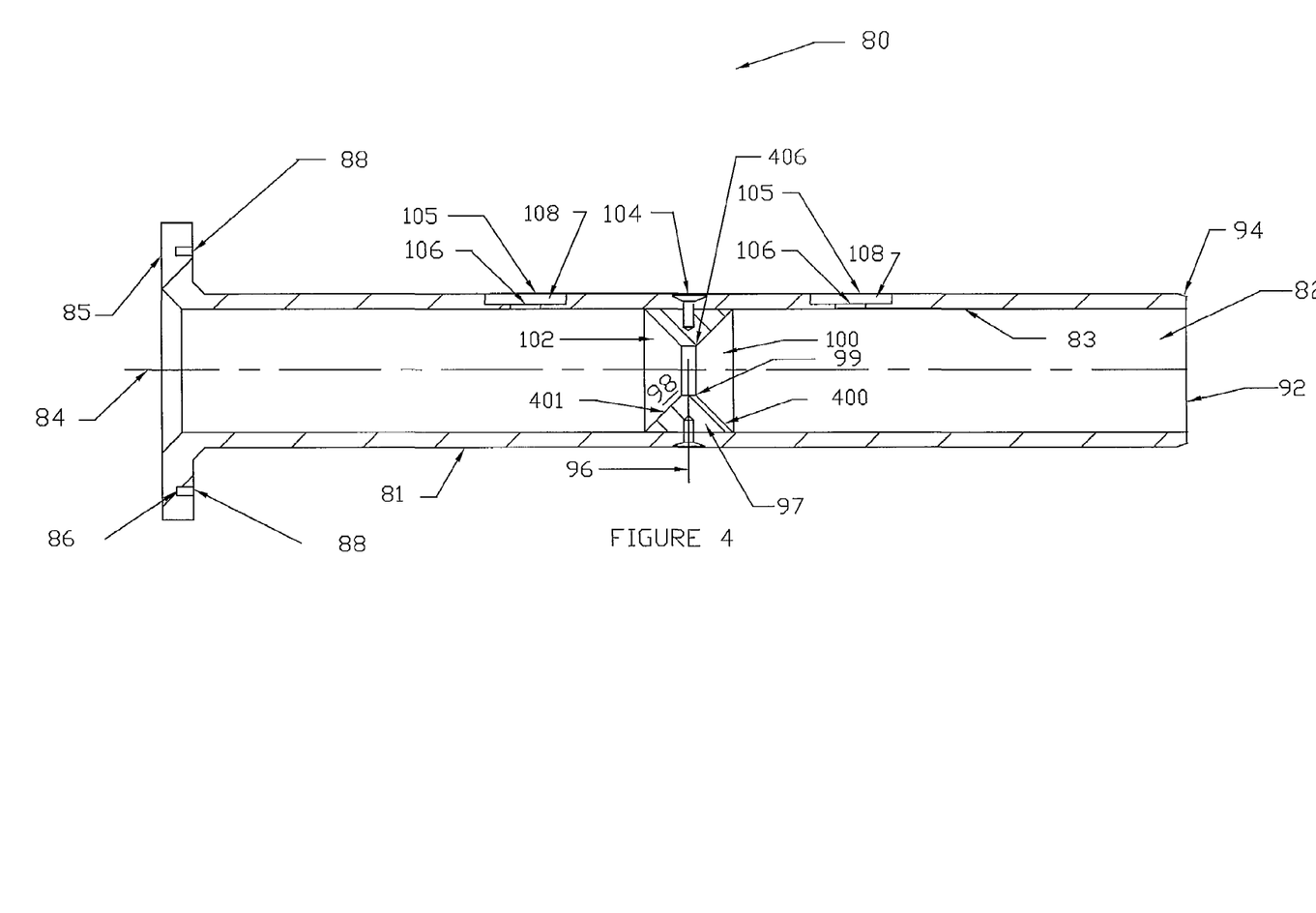
FIG. 4 is a cross-sectional view of the calibrated tube taken along the horizontal center line.

Turning to the drawings, FIG. 2 to 4 show a flow meter 30, which is one of the preferred embodiments of the present invention, and illustrates its various components. A preferred embodiment of flow meter 30, as shown in FIG. 2, comprises a housing 31 which receives therein an inner member 80. Inner member 80 has a central bore 82 through which a fluid flows in a direction indicated by arrow "A". Although the fluid in FIG. 2 is shown as flowing in direction "A", this is for illustration purposes only, and those skilled in the art will recognize that the various possible embodiments permit accurate metering of fluid flowing in either direction through flow meter 30. Flow meter 30 can be installed in either a 'forward' or 'reverse' orientation with no effect on the accuracy or operation of the flow meter. A flow restrictor 97 is formed internally within the inner wall of inner member 80 and forms part of a metering structure. First and second port connections 47 and 49 respectively are equidistantly spaced from flow restrictor 97. First port connection 47 is positioned upstream from flow restrictor 97 and second port connection 49 is positioned downstream from flow restrictor 97.

As illustrated in FIG. 2, housing 31 generally comprises a tubular body 32 having a flange 33 at a first end 34 thereof and a second flange 35 at a second end 37. First and second flanges 33 and 35 have a plurality of attach holes 36 to affix flow meter 30 within a pipeline. Second end 37 is configured in a manner to mate with a tube or a pipe in a fluid transmission system (not shown), and can take on a variety of configurations dependent on the requirements of the fluid transmission system. Housing 31 has an internal bore 42 extending longitudinally therethrough and has a central longitudinal axis 44. Peripheral lip 43 extends radially into internal bore 42 at second end 37 to define a bore opening at second end 37 that is smaller in diameter than bore 42. Peripheral lip 43 has an internal chamfer 39 which substantially faces inwardly from the opening to internal bore 42 at second end 37.

First end 34 of housing 31 has a circular recess 38 machined therein and further includes at least two alignment pins 40 embedded within flange 33 and extending into recess 38. Alignment pins 40 are precision located in a predefined pattern for engagement and positioning of a first end of inner member 80 as further described below.

Flow meter 30 has a vertical center line generally shown by dashed line 45. First and second port connections 47 and 49 respectively are positioned equidistant from centerline 45. Port connections 47 and 49, in the preferred embodiment, are connections that are commercially available and well known in the art. Port connections 47 and 49 are affixed to tubular body 32 by welding to a top portion thereof. Each of port connections 47 and 49 has a vertical bore 51 extending therethrough and are in fluidic communication with internal bore 42. An upper portion 52 of central bore 51 in port connections 47 and 49 are internally threaded while a lower portion 53 is a smooth non-threaded bore and generally of smaller diameter than upper portion 52. Each of port connections 47 and 49 receive therein a hollow core bolt 55.

Referring also to FIG. 3, each hollow core bolt 55 has an upper threaded shank portion 59 and a lower non-threaded shank portion 61. Each bolt 55 is threaded into each of port connections 47 and 49 (shown in FIG. 2) to a desired depth wherein lower non-threaded shank portion 61 extends into internal bore 42 (shown in FIG. 2) in a sealing manner with inner member 80 as further described below. Bolts 55 are retained in their vertical position within port connections 47 and 49 by lock nuts 56 (shown in FIG. 2) engaging a portion of upper threaded shank 59 and bearing against a top of port connections 47 and 49. Bolts 55 also have a head 58 (shown in FIG. 2) which extends above lock nuts 56. A central bore 57 extends the length of bolt 55 to provide fluid communication with housing internal bore 42. Head 58 further includes a threaded bore 60 for receiving a pressure gauge or a pressure transmission tube for connection to a pressure gauge. Smooth non-threaded shank portion 61 of bolt 55 includes a groove 62 therearound. Groove 62 retains a first O-ring 66 to create a pressure seal between lower smooth portion 53 of central bore 51 (shown in FIG. 2) in port connections 47 and 49 and lower unthreaded shank 61 of bolt 55. Bottom 63 of bolt 55 defines a second circular groove 64 therein which retains a second O-ring 68 for sealing engagement with inner member 80 as further described below.

FIG. 4 illustrates inner member 80 which generally comprises inner cylindrical tube 81 having a flange 86 at a first end 85. Flange 86 is generally circular in configuration and is sized to be received within circular recess 38 at first end 34 of housing 31 (as shown in FIG. 2). Flange 86 includes alignment pin holes 88 therein in a precision pattern coincident with the pattern of alignment pins 40 in recess 38 of housing 31 (as shown in FIG. 2). Inner cylindrical tube 81 has an inner wall 83 which defines an internal bore 82 extending longitudinally therethrough. Bore 82 has a central longitudinal axis illustrated by dash line 84. As illustrated in FIG. 4A,inner cylindrical tube 81 has a pressure equalization hole 90 extending therethrough permitting fluidic communication between internal bore 82 and an exterior of inner cylindrical tube 81. Inner member 80 has a second end 92 which has an external chamfer 94 at second end 37 of housing 31 (as shown in FIG. 2). Chamfer 94 is angularly oriented substantially equal to internal chamfer 39 (as shown in FIG. 2) for engagement therewith. Inner member 80 has a vertical center line shown by dash line 96. Vertical center line 96 of inner member 80 and vertical center line 45 of housing 31 are substantially coincident when inner member 80 is received into housing 31. A flow restrictor 97 is integrally formed within the inner wall 83 of cylindrical tube 81. In the preferred embodiment, flow restrictor 97 is a 360 degree torus wedge 98 having opposing first and second wedge member 100 and 102 respectively. Wedge member 100 and 102 have substantially a full internal V-shaped circumference and are adjoined at circular vertex 406 to form flow constrictor member 99.

Wedge member 100 and 102 each are respectively defined by circular base (400, 401) and adjoining circular vertex (406). Both base 400 and 401 have a diameter coincident to the diameter of inner cylindrical tube 81. Along the circumference of base 400 and 401, internal wall 83 uniformly inclines inwardly and converges into the circumference of vertex 406 to form constrictor member 99. The inclined V-shaped inner wall of wedge member 100 and 102 reduces the area available to flow through constrictor member 99, but the inclined V-shaped inner wall also channels the incoming and outgoing flow through constrictor member 99.

The diameter of circular vertex 406 is smaller than diameter of base 400 and 401, thereby restricting the fluid flow through internal bore 82. However, in the preferred embodiment, the diameter of circular vertex 406 can be any diameter necessary to create the differential used for measurement. Constrictor member 99 is formed within inner wall 83 of cylindrical tube 81 such that the central radius of constrictor member 99 is substantially perpendicular to both longitudinal axis 84 and the diameter of constrictor member 99 is coincident with vertical axis 96. Torus wedge 98 is retained to housing 31 by fastener 104 thereby rendering torus wedge 98 removable and readily replaceable with a torus wedge of different dimensions or configuration.

The angular inclined depth between adjoining wedge members 100 and 102 as taken along vertical center line 96 perpendicular to axis 84 ranges between 45 and 90 degrees. Those knowledgeable in the art will also realize that opposing wedges 100 and 102 can also be utilized to provide the desired flow restriction with substantially the same results as a single wedge as disclosed in the prior art. Each combined wedge 98 (wedge members 100 and 102) and tube 81 can be precalibrated for use in any housing 31 without requiring recalibration of the tube-wedge combination. However, those skilled in the art will also recognize that the replacement of a wedge 98 in a specific tube 81 will require recalibration of the wedge-tube combination.

Cylindrical tube 81 further includes circular recesses 105 at a top portion thereof. Recesses 105 are equally spaced about center line 96 and upon receipt of inner member 80 within housing 31 are in vertical registration with central bores 51 of port connections 47 and 49 (as shown in FIG. 2). Recesses 105 have a circular land 108 and a pressure port 106 extending through land 108 to internal bore 82.

Figure 5:
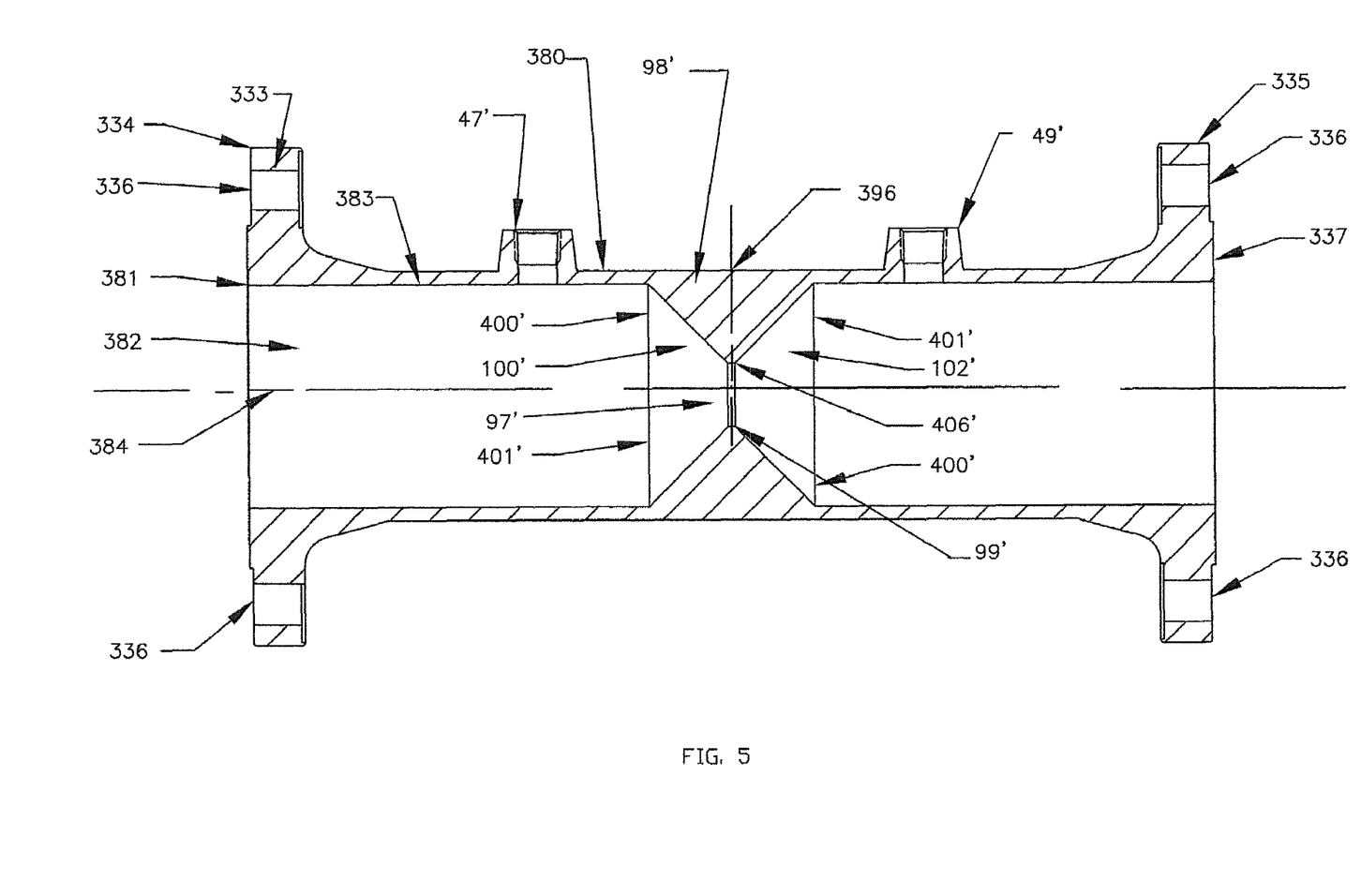
FIG. 5 is an alternative embodiment of a cross-sectional view of the calibrated yube taken along the horizontal center line.

FIG. 5 illustrates another aspect of the present invention wherein the torus wedge is incorporated into outer member 380. Outer member 380 which generally comprises inner cylindrical tube 381 having a flange 333 at a first end 334 thereof and a second flange 335 at a second end 337. First and second flanges 333 and 335 have a plurality of attach holes 336 to affix outer member 380 within a pipeline. Inner cylindrical tube 381 has an inner wall 383 which defines an internal bore 382 extending longitudinally therethrough. Bore 382 has a central longitudinal axis illustrated by dash line 384. Outer member 380 has a vertical center line shown by dash line 396. A flow restrictor 97' is integrally formed within the inner wall 383 of cylindrical tube 381. In the preferred embodiment, flow restrictor 97' is a 360 degree torus wedge 98' having opposing first and second wedge member 100' and 102' respectively. Wedge member 100' and 102' have substantially a full internal V-shaped circumference and are adjoined at circular vertex 406' to form flow constrictor member 99'.

Wedge member 100' and 102' each are respectively defined by circular base (400', 401') and adjoining circular vertex (406'). Both base 400' and 401' have a diameter coincident to the diameter of inner cylindrical tube 381. Along the circumference of base 400' and 401', internal wall 383 uniformly inclines inwardly and converges into the circumference of vertex 406' to form constrictor member 99'. The inclined V-shaped inner wall of wedge member 100' and 102' reduces the area available to flow through constrictor member 99', but the inclined V-shaped inner wall also channels the incoming and outgoing flow through constrictor member 99'.

The diameter of circular vertex 406' is smaller than the diameter of base 400' and 401', thereby restricting the fluid flow through internal bore 382. Constrictor member 99' is formed within inner wall 383 of cylindrical tube 381 such that the central radius of constrictor member 99' is substantially perpendicular to both longitudinal axis 384 and the diameter of constrictor member 99' is coincident with vertical axis 396.

The angular inclined depth between adjoining wedge members 100' and 102' as taken along vertical center line 396 perpendicular to axis 384 ranges between 45 and 90 degrees. Those knowledgeable in the art will also realize that opposing wedges 100' and 102' can also be utilized to provide the desired flow restriction with substantially the same results as a single wedge as disclosed in the prior art. In use, each combined wedge 98' and cylindrical tube 381 must be pre-calibrated.

In use, referring to FIG.'S 1-4, a housing 31 is selected for insertion in a fluid line to measure the fluid flow therethrough. An inner member 80 comprising a specific 360 degree wedge 98 and tube 81 configuration is selected based upon the type of fluid to be measured and the flow rate to be measured thereby. Inner member 80 is telescopically inserted into first end 34 of housing 31 and aligned so that alignment pins 40 in circular recess 38 are received in alignment pin holes 88 of flange 86 (as shown in FIG. 4). Engagement of pins 40 in holes 88 substantially centers first end 85 with respect to bore 42 (as shown in FIG. 2). Upon full insertion chamfer 94 at second end 92 of inner member 80 is received by internal chamfer 39 of housing 31. The tapered surfaces of chamfers 39 and 94 interact such to center the second end 92 of inner cylindrical tube 81 within internal bore 82 of housing 31. Flange 86 of inner member 80 is sealed against circular recess 38 and inner cylindrical tube 81 is centered along its length within internal bore 42 of housing 31.

Since, the outer diameter of inner cylindrical tube 81 is smaller than bore 42, a space 110 (as shown in FIG. 3) is defined by the outer diameter of tube 81 and inner bore 42 of housing 31 (as shown in FIG. 2). Space 110 is sealed from internal bore 82 of inner member 80 except for pressure equalization hole 90 (FIG. 4A) which permits the fluid pressure within space 110 to be equalized with the pressure of the fluid flowing through internal bore 82. However, because space 110 is otherwise sealed from internal bore 82, there is no fluid flow therethrough. After inner member 80 is received and centered within internal bore 42, hollow core bolts 55 are inserted in first and second port connections 47 and 49. Bolts 55 are threaded down until first O-ring 66 (as shown in FIG. 3) seals the upper portion of bore 51 from the fluid pressure in space 110. Further, bottom 63 of bolt 55 bears against circular land 108 of inner cylindrical tube 81 such that second O-ring 68 seals space 110 from internal bore 82. Lock nuts 56 are used to secure bolts 55 within port connections 47 and 49 to maintain the pressure seals created by O-rings 66 and 68. Pressure gauges or fluid pressure transmission lines (not shown) can be coupled with threaded bore 60 in head 58 of bolt 55 such that when a fluid flows through bore 82, the pressure differential between pressure port 106 at port connection 47 upstream from the flow restrictor 97 can be compared with the pressure at pressure port 106 of port connection 49 downstream from flow restrictor 97 in a manner well known in the art to determine the fluid flow rate therethrough. The preferred embodiment permits the measurement of fluid flow in a bi-directional manner with out loss of metering accuracy in either direction.

Those skilled in the art will recognize that different flow restrictor sizes, shapes and configurations can be utilized to optimize the fluid flow metering performance of meter 30, and that different quantities of pressure sensing ports can also be utilized as alternate embodiments. Further, in addition to the foregoing description, those skilled in the art will readily appreciate that other modifications may be made to the invention without departing from the concepts disclosed herein. Such modifications are to be considered as included in the following claims, unless these claims expressly state otherwise.

I claim:

1. A flow meter for measuring the volume of fluid flowing through the meter comprising:
   an inner cylindrical tube through which the fluid flows;
   an outer cylindrical tube tending over the inner cylindrical tube and radially spaced from the cylindrical inner tube to provide an annular cylindrical space between the inner cylindrical tube and the outer cylindrical tube;
   a seal between the inner cylindrical and the outer cylindrical tube closing the annular cylindrical space adjacent ends of the annular cylindrical space with the pressure in the inner cylindrical tube;
   a flow restriction member integrally formed within an inner wall of the inner cylindrical tube, the flow restriction member being defined by two opposing wedge members adjoined at a circular vertex having a smaller diameter than the inner cylindrical tube, the circular vertex for restricting the flow of fluid through the inner cylindrical tube and producing a pressure drop in the fluid as it flows through the circular vertex;
   the inner cylindrical tube and the outer cylindrical tube in combination further define at least two ports for receiving a pressure sensing device to measure the pressure of the fluid through the flow meter, wherein at least a first of the ports is positioned at an upstream area of the flow meter from the circular vertex, and at least a second of the ports is positioned at a downstream area from the circular vertex;
   the outer cylindrical tube has a first flange at a first end thereof, a recess defined within the flange, and at least two alignments pins extending from a surface of the recess; and
   the inner cylindrical tube has a second flange at a first end thereof, the second flange abutting the first flange within the recess and further having holes receiving the alignment pins therein for centering the inner cylindrical tube within the outer cylindrical tube.

2. The flow meter according to claim 1 wherein:
   the outer cylindrical tube has an internal chamfer at a second end thereof; and
   the inner cylindrical tube has an external chamfer at a second end thereof, engaging the internal chamfer when the inner cylindrical tube is received within the outer cylindrical tube to center the second end of the inner cylindrical tube within the second end of the outer cylinder tube.

3. The flow meter according to claim 2 wherein the circular vertex is positioned substantially centrally to the first and the second ends of the inner cylindrical tube.

4. The flow meter according to claim 2 wherein the circular vertex has a central axis lying perpendicular to a longitudinal axis of the inner cylindrical tube.

5. The flow meter according of claim 4 further comprising an angular inclined depth between the adjoined wedge members as measured along the longitudinal axis of the inner cylindrical tube.

6. The flow meter according to claim 4 wherein the first port is positioned a predefined distance from the wedge as measured along the longitudinal axis of the inner cylindrical tube.

7. The flow meter according to claim 6 wherein at least one port comprises:
   a port connection on the outer cylindrical tube having a partially threaded bore in fluid communication with an interior of the outer cylindrical tube;
   a circular land on an exterior of the inner cylindrical tube, the land further defining an aperture therethrough in fluid communication with an interior of the inner cylindrical tube;
   a hollow core bolt having a central bore therethrough, the bolt received within the partially threaded bore and a bottom portion thereof abutted to the land; and
   a seal isolating the central bore from the annular cylindrical space for transmitting fluid pressure from the inner cylindrical tube through the central bore.

8. The flow meter according to claim 1 wherein each wedge member further comprises:
   a base having a diameter equivalent to the inner cylindrical tube; and
   the inner wall uniformly inclining downwardly from the base and converging into the circular vertex to form an internal V shape restriction spanning the entire circumference of the inner cylindrical tube, the V-shape restriction for reducing the area available for flow through the inner cylindrical tube.

9. The flow meter according to claim 1 wherein the first and the second ports are equally spaced relative to the circular vertex along the longitudinal axis of the inner cylindrical tube.

10. A flow meter for measuring the volume of fluid flowing through a passageway, the meter comprising:
    an outer housing having a first internal bore;

a removable inner member telescopically received in the first internal bore and suspended therein, the first internal bore and an outer surface of the inner member in combination defining a space therebetween, the space isolated from fluid flowing therthrough;

the inner member having a second internal bore of a first predefined cross-sectional area to accommodate the flow therethrough, the second internal bore in pressure equalizing communication with the space;

a flow restrictor being formed within a wall of the inner member for measuring the fluid flow therethrough;

the outer housing has a first flange at a first end thereof, a recess defined within the flange, and at least two alignment pins extending from a surface of the recess; and the inner member has a second flange at a first end thereof, the second flange abutting the first flange within the recess and further having holes receiving the alignment pins therein for centering the inner member within the bore of the outer housing; and wherein the flow restrictor is integrally formed within an inner wall of the inner member, the flow restrictor being defined by two opposing wedge members adjoined at a circular vertex having a smaller diameter than the inner cylindrical tube, the circular vertex for restricting the flow of fluid through the inner member and producing a pressure drop in the fluid as in flows through the circular vertex.

11. The flow meter according to claim 10 wherein:

the first internal bore of the outer housing has an internal chamfer at a second end thereof; and the inner member has an external chamfer at a second end thereof, the external chamfer engaging the internal chamfer when the inner member is received within the outer housing first internal bore to center the second end of the inner member within the second end of the outer housing first internal bore.

12. The flow meter according to claim 10 wherein the circular vertex is positioned substantially centrally to the first and second ends of the inner member.

13. The flow meter according 10 wherein an angular inclined depth between the adjoined wedge members, as taken along the longitudinal axis of the inner member, ranges between 45 and 90 degrees.

14. The flow meter according to claim 10 further comprising at least one port, said at least one port positioned a predefined distance from the circular vertex as measured along a longitudinal axis of the second internal bore.

15. The flow meter according to claim 14 wherein at least one port comprises:

a port connection on the outer housing having a partially threaded bore in fluid communication with an interior of the outer housing;

a circular land on an exterior of the inner member, the land further defining an aperture therethrough in fluid communication with an interior of the inner member;

a hollow core bolt having a central bore therethrough, the bolt received within the partially threaded bore and a bottom portion thereof abutted to the land; and a seal, isolating the central bore from the space for transmitting fluid pressure from the second internal bore through the central bore.

16. The flow meter according to claim 14 wherein the inner member and the outer housing in combination define at least two ports for receiving a pressure sensing device.

17. The flow meter according to claim 14 wherein at least one port is positioned at an upstream area of the flow meter from the circular vertex, and further comprising at least a second port positioned at a downstream area of the flow from the circular vertex.

18. The flow meter according to claim 10 further comprising at least two ports, wherein a first port and a second port of said at least two ports are equally spaced along the longitudinal axis of the inner tube member from the circular vertex.

19. A flow meter for measuring the volume of fluid flowing through the meter comprising:

a cylindrical tube through which the fluid flows;

a flow restriction member integrally formed within an inner wall of the cylindrical tube, the flow restriction member being defined by two opposing wedge members adjoined at a circular vertex having a smaller diameter than the inner wall of the cylindrical tube, the circular vertex for restricting the flow of fluid through the cylindrical tube and producing a pressure drop in the fluid as it flows through the circular vertex;

the cylindrical tube further defines at least one port for receiving a pressure sensing device to measure the pressure drop of the fluid through the flow meter;

the cylindrical tube has a first flange at a first end thereof, and the cylindrical tube has a second flange at a second end thereof.

20. The flow meter according to claim 19 wherein each wedge member further comprises:

a base having a diameter equivalent to the inner wall of the cylindrical tube; and the inner wall uniformly inclining downwardly from the base and converging into the circular vertex to form an internal V-shape restriction spanning the entire circumference of the inner cylindrical tube, the V-shape restriction for reducing the area available for flow through the cylindrical tube.

21. The flow meter according to claim 20 wherein the circular vertex is positioned substantially centrally to the first and the second ends of the cylindrical tube.

22. The flow meter according to claim 20 wherein the circular vertex has a central axis lying perpendicular to longitudinal axis of the cylindrical tube.

23. The flow meter according to claim 22 wherein the angular inclined depth between the adjoined wedge members as measured along the longitudinal axis ranges between 45 and 90 degrees.

24. The flow meter according to claim 22 wherein at least one port is positioned a predefined distance from the flow restriction member as measured along a longitudinal axis of the inner cylindrical tube.

25. The flow meter according to claim 19 wherein the cylindrical tube defines at least one second port for receiving a pressure sensing device.

26. The flow meter according to claim 25 wherein at least one port is positioned at an upstream area of the flow meter from the circular vertex, and at least one second port is positioned at a downstream area of the circular vertex.

27. The flow meter according to claim 26 wherein at least one port and at least one second port are equally spaced along the longitudinal axis of the outer cylindrical tube from the flow restriction member.

* * * * *